United States Patent [19]

Wiesböck

[11] 4,077,585
[45] Mar. 7, 1978

[54] INERTIA TYPE WIND UP DEVICE FOR SAFETY WEB BELT

[75] Inventor: Josef Wiesböck, Dachau, Germany

[73] Assignee: Firma Hans Kolb GmbH & Co., Grobberghofen, Germany

[21] Appl. No.: 738,739

[22] Filed: Nov. 4, 1976

[51] Int. Cl.$^2$ .................. A62B 35/02; B65H 75/48
[52] U.S. Cl. ........................................... 242/107.4 B
[58] Field of Search ............. 242/107.4 R, 107.4 E, 242/107.6, 107.7; 297/388; 280/744–747; 188/82.74, 82.9, 135–139

[56] References Cited

U.S. PATENT DOCUMENTS 3,666,198  5/1972  Neumann ............... 242/107.4 B
3,970,265  7/1976  Köpke et al. ............ 242/107.4 B

FOREIGN PATENT DOCUMENTS 2,349,613  10/1975  Germany .............. 242/107.4 A
2,405,460  7/1975   Germany .............. 242/107.4 A Primary Examiner—Harvey C. Hornsby
Assistant Examiner—John M. Jillions
Attorney, Agent, or Firm—James E. Nilles

[57] ABSTRACT

Inertia type wind up device for safety web belt and having a winding shaft and an inertia blocking wheel rotatably mounted on the winding shaft and which wheel is axially shiftable on the winding shaft upon abrupt acceleration of the shaft against a wind up spring and by means of oblique cam and follower surfaces on the blocking wheel and winding shaft.

5 Claims, 5 Drawing Figures

INERTIA TYPE WIND UP DEVICE FOR SAFETY WEB BELT

BACKGROUND OF THE INVENTION

In a known device of this kind (U.S. Pat. No. 3,058,687) there are arranged, on a flange that is secured to the winding shaft and on the inertia blocking wheel, respectively, three oblique saw-tooth-form cam and cam engaging surfaces. In the release condition, the three "saw teeth" consistently grip into one another, whereby the steep tooth flanks provide striking surfaces which prevent a further movement of the inertia blocking wheel under the action of the release spring. The movement of the inertia blocking wheel in the blocking condition takes place in the direction towards the free end of the winding shaft. The counter-blocking elements are formed on a cover that closes the housing, which, for this purpose, must be maintained strong and rigid. When a device of this type is installed in a vibrating vehicle, particularly a moving power vehicle, a noise formation usually cannot be avoided. The weak release spring of course presses the inertia blocking wheel with only a very small force in the withdrawal condition, so that the steep tooth flanks, through vibration and jerky tension changes in the web, repeatedly become temporarily disengaged and thereafter strike one another again. The metal tooth flanks thereby produce a rattling and annoying noise. The necessity for applying a stiff, strong cover for closing the housing, moreover, makes the construction heavy and also somewhat expensive.

To avoid the last mentioned disadvantages, it is known to move the inertia blocking wheel in the direction away from the free end of the winding shaft in the blocking condition. The counter-blocking elements can then be formed on a partition in the housing that must nonetheless be substantially strong in order to accommodate a bearing for the winding shaft. With this, provision must be made for having the inertia blocking wheel, in the release condition, lie against a stop that prevents its sliding off of the free end of the winding shaft. For this there can usually be employed a spring ring mounted on the winding shaft. Here, too, unpleasant chattering noises arise in the release condition through the contact of two metal surfaces. In addition, with this known arrangement there is provided, for the axial movement of the inertia blocking wheel, a threaded engagement between this wheel and the winding shaft which demands an expensive and very precise thread cutting.

SUMMARY OF THE INVENTION

The invention solves the problem of so forming a device of the class defined in the introduction that it is quiet and simple to manufacture and to install.

The device according to the invention is of the type in which the inertia blocking wheel is moved in the direction away from the free end of the winding shaft in the blocking condition. Thereby one arrives at a simple and inexpensive protective cover. The movement is effected by means of simple cam and cam-engaging oblique surfaces, which, together with the associated extension and associated recess, respectively, can be produced simply and without requirements for high accuracy. In the installation the inertia cam wheel allows itself to be pushed axially on the winding shaft in a simple manner and arrives at its working position through a small bayonet-connection-type rotation. The insert part prevents the inertia blocking wheel from again loosening itself from the winding shaft. Moreover, when it is produced from noise damping material, particularly plastics, it assures the main advantage of the invention, namely, that the apparatus is practically free from noise in the withdrawal condition of the inertia blocking wheel. In this condition, only the noise-damping material of the insert part and its cooperating metallic surface come into vibrating contact with one another, so that no disturbing noise is produced.

BRIEF DESCRIPTION OF THE DRAWINGS

FIGS. 3a–3c are developed projections, in section, of the engagement between inertia blocking wheel and winding shaft, wherein FIG. 3a shows the situation before assembly, FIG. 3b shows the release condition and FIG. 3c shows the blocking condition.

DESCRIPTION OF A PREFERRED EMBODIMENT

Figure 1:
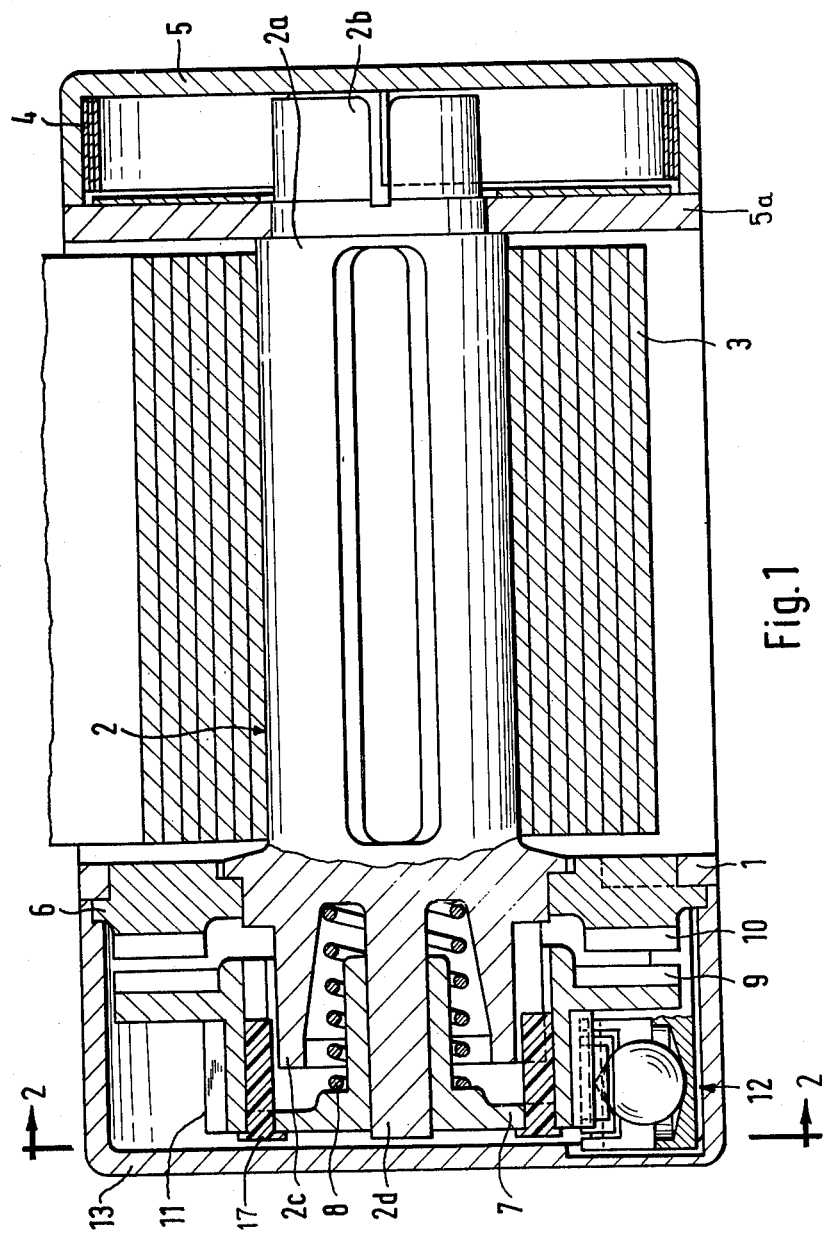
FIG. 1 is a longitudinal section through a device made in accordance with the present invention.
Figure 2:
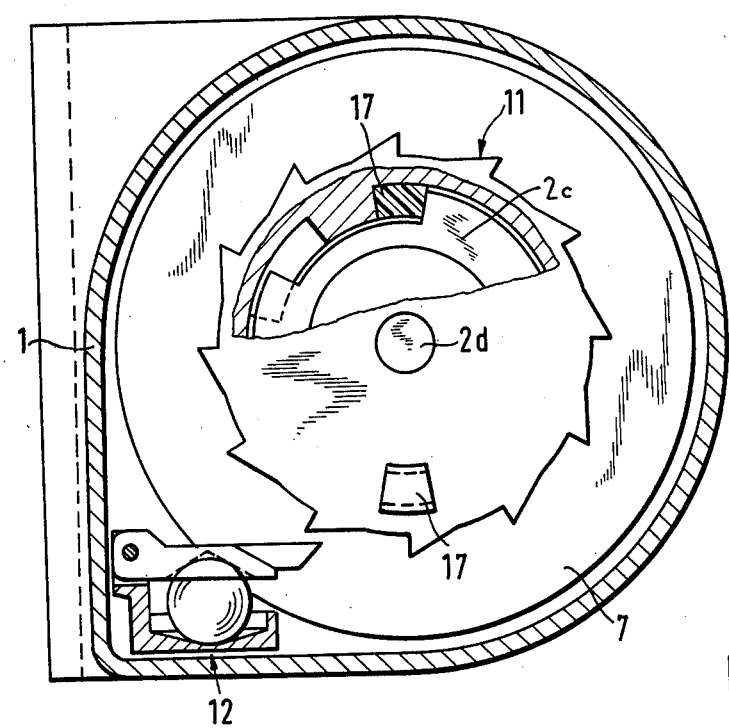
FIG. 2 is a view of the device shown in FIG. 1, but with the cover removed, the view being taken generally along the line 2—2 in FIG. 1, but partly in section.

In FIG. 1 a housing is designated by 1, in which a winding shaft 2 is rotatably supported. On a winding section 2a of the winding shaft 2, a belt web 3 of a safety belt is wound up. The winding up actuates a spiral spring 4 which at one end engages one end 2b of the winding shaft 2 and which is covered at the outer side by means of a housing cover 5.

The other end 2c of the winding shaft extends through a stable partition 6 inserted in the housing 1, in which the winding shaft is supported, as also in the front wall 5a of the housing that is adjacent to the housing cover 5. On a pin 2d turned out of the center of the shaft end 2c, an inertia blocking wheel 7 is rotatably supported. It is urged axially in the direction of the free end of the winding shaft portion 2c by a weak release spring 8. Sliding off is prevented by means described hereinafter.

On its surface facing the partition 6, the inertia blocking wheel 7 carries blocking elements 9 in the form of gear teeth which cooperates with counter-blocking elements 10 on the partition, likewise formed as a spur gear. In a circumferential zone of the inertia blocking wheel 7 there is additionally provided a toothed ratchet 11 which, together with an inertia controlled pawl device designated generally by 12, assures a vehicle sensitive blocking which is not of interest within the framework of the present invention and is therefore not more particularly described.

The shaft end 2c and the parts supported thereon are covered with a dome-shaped cover 13.

Figure 3C:
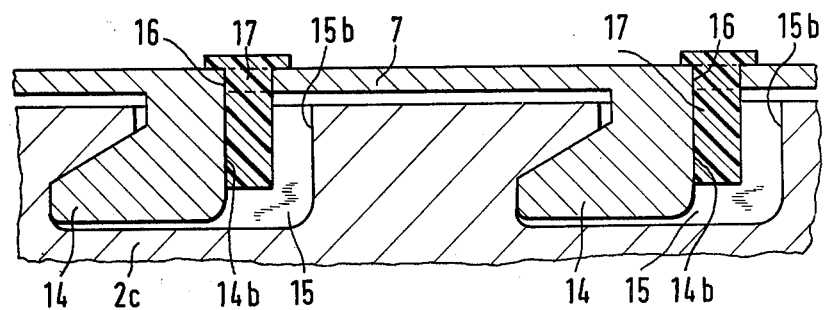
Figure 3B:
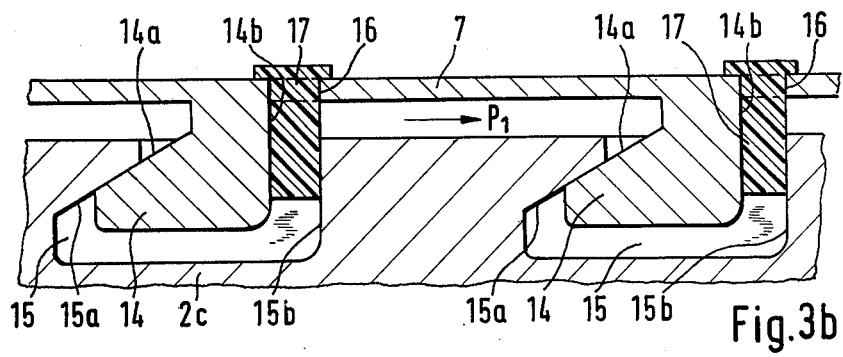
Figure 3A:
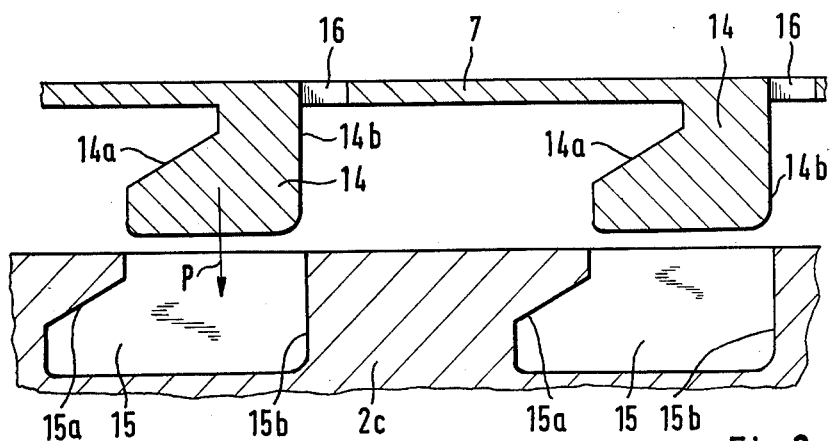

In the following there will be described with the aid of FIGS. 3a–3c the means by which the inertia blocking wheel is displaced out of the withdrawal condition shown in FIG. 1, axially in the direction toward the partition 6, by an abrupt acceleration of the winding shaft 2 against the wind-up spring 4, so that the blocking- and counter-blocking elements 9 and 10, respectively, come into engagement and a further rotation of the winding shaft 2 is prevented:

As the development of FIGS. 3a–3c shows, hook-shaped projections 14 extend from the inertia blocking wheel 7 in the direction towards the partition 6. The surface that faces the inertia blocking wheel 7 is formed as an inclined oblique cam surface 14a.

On the periphery of the winding shaft end 2c, angle shaped recesses 15 are hollowed out, with shanks extending in the axial direction of the winding shaft 2 that open to the free front surface of the winding shaft end 2c, and which are so wide that in the assembly (see FIG. 3a) the projections 14 of the inertia blocking wheel 7 can be inserted into the recesses 15 in the axial direction of the winding shaft, as indicated by an arrow P. The circumferentially extending shank of each angle-shaped recess 15 has a surface facing the free end of the winding shaft that is formed as an oblique cam engaging surface 15a. After the axial insertion of the projections 14 into the recesses 15, the inertia blocking wheel is rotated in the manner of a bayonet connection so that the surfaces 14a and 15a come into abutment with one another. This contact is maintained by the action of the release spring 8, which, in FIGS. 3b and 3c, biases the inertia blocking wheel 7 upwardly.

After the assembly of the wheel 7, to prevent an unintended release of the inertia blocking wheel 7 from the winding shaft 2, insert parts 17 consisting of noise damping material, particularly plastics or hard rubber, are pressed into holes 16 arranged adjacent to the rear of the projections 14. As can be seen from FIG. 3b specifically, the insert parts 17 are so dimensioned that they engage the surfaces 15b of the recesses 15 that extend in the axial direction of the winding shaft, before the cam surfaces 14a completely slide off of the cam-engaging surfaces 15a. FIG. 3b distinctly shows that the inertia blocking wheel 7 is held securely on the shaft end 2c by the insert parts 17. Each of the plug-like insert parts 17 thereby lies between the rear surface 14b of a hook-like projection 14 and the axially extending surface 15b of the recess 15.

The mode of operation can be understood from a comparison of FIGS. 3b and 3c:

FIG. 3b shows the parts in withdrawal condition. Each insert part 17 lies against the surface 15b. In consequence of the vibration of the power vehicle or a similar conveyance in which the safety belt device is installed, the inserts 17 repeatedly lift themselves temporarily away from the abutment surfaces 15b and are brought back into contact by the release spring 8, acting through the cooperating surfaces 14a, 15a. As a result, no noise is produced, as the insert parts 17 are formed of a noise damping material. To this point the blocking and counter-blocking elements 9, 10 remain in the disconnected condition seen in FIG. 1. The belt web 3 can therefore be unwound by slowly drawing it out of the housing under the tension of the wind-up spring 4.

If the belt web is subjected to an abrupt acceleration which imparts to the winding shaft 2 a corresponding abrupt rotation, the winding shaft end 2c promptly moves at its periphery in the direction of the arrow $P_1$ in FIG. 3b. Owing to its mass inertia, the inertia blocking wheel 7 cannot follow this movement. The oblique cam engaging surface 15a thereupon runs upon the oblique cam surface 14a, whereby the inertia blocking wheel 7 is drawn downwardly in FIG. 3b and thus toward the free front surface of the winding shaft end 2c. The inertia blocking wheel 7 thus comes to the condition according to FIG. 3c. In this, the blocking elements 9 engage in the counter-blocking elements 10, whereby a further rotation of the inertia blocking wheel 7 relative to the housing 1 is prevented. Simultaneously, the further rotation of the winding shaft is thereby blocked, and the further withdrawal of the belt web is prevented in the desired manner.

Upon the cessation of the abrupt acceleration, the release spring 8 brings the parts back to the condition according to FIG. 3b. In this, too, no undesired noise is produced, since the insert parts 17 engage the surfaces 15b without substantial noise generation.

The invention is not limited to the illustrated embodiments. In particular, the insert parts 17 can be connected with the inertia blocking wheel 7 in another manner than by pressing them in, for example, by cementing, snapping in or riveting. Also, the insert parts 17, instead of being on the inertia blocking wheel, could be arranged on the winding shaft 2, for example, as a covering of the individual surfaces 15b. Then there need only remain mounting recesses in the inertia blocking wheel 7 into which the inserts 17, as usual, are fitted after assembly of the inertia blocking wheel 7.

I claim:

1. A device for rolling up a belt of a safety belt assembly for vehicles or the like, said device comprising, a housing, a winding shaft rotatably mounted in said housing, a wind up spring connected between said housing and said shaft and for biasing the latter in one direction of rotation, an inertia blocking wheel rotatably mounted on said winding shaft at one end thereof, an angle-shape recess in said shaft and adjacent said one end thereof, an axially extending hook-like projection carried by said blocking wheel and located in said recess, said recess facing axially and towards said inertia blocking wheel, said recess being larger than said projection whereby said hook-like projection is inserted axially into and located in said angle-shape recess in bayonet-connection-fashion, said recess and projection each having an oblique cam surface which are complementary to and inter-engaging with one another for relative movement therebetween upon relative movement between said shaft and said blocking wheel, an insert of noise damping material adjacent said blocking wheel projection and inserted in said recess, said insert limiting rotational movement between said wheel and shaft to prevent axial withdrawal of said projection from said recess, said blocking wheel being shiftable within limits in an axial direction in respect to said shaft, interengaging blocking elements carried by said blocking wheel and said housing and facing one another so that said elements (1) are disengaged when said blocking wheel is shifted axially away from said shaft end, (2) and are engaged upon acceleration of said shaft in the other direction of rotation against the bias of said spring and said oblique cam engaging surfaces move relative to one another and said blocking wheel consequently shifts axially towards said shaft from further rotation in said other direction of rotation relative to said housing.

2. The device set forth in claim 1 further characterized in that said insert is formed of plastic material.

3. A device as set forth in claim 1 further characterized in that said insert is carried by said inertia blocking wheel in abutting relationship with said projection.

4. The device according to claim 3 in that said insert is formed as a plug, said blocking wheel has a hole therethrough, and said plug is pressed into said hole for being removably carried by said blocking wheel.

5. A device for rolling up a belt of a safety belt assembly for vehicles or the like, said device comprising, a housing, a winding shaft rotatably mounted in said housing, a wind up spring connected between said housing and said shaft and for biasing the latter in one direction of rotation, an inertia blocking wheel rotatably mounted on said winding shaft at one end thereof, an angle-shape recess in said one end of said shaft and in axially and radially opening directions therefrom, said recess having an oblique cam engaging surface, an axially extending hook-like projection carried by said blocking wheel and shiftably located in said recess, said projection having an inclined oblique cam surface which is complementary to and inter-engaging with said recess cam engaging surface for relative movement between said surfaces upon relative movement between said shaft and said blocking wheel, said recess being larger than said projection whereby said hook-like projection is inserted axially into and located in said angle-shape recess in bayonet-connection-fashion for rotation by shifting therein and between blocking and release positions, said blocking wheel being shiftable within limits in an axial direction in respect to said shaft, inter-engaging blocking elements carried by said blocking wheel and said housing and facing one another so that said elements (1) are disengaged when said blocking wheel is shifted axially away from said shaft end, (2) and are engaged upon acceleration of said shaft in the other direction of rotation against the bias of said spring and said oblique surfaces move relative to one another and said blocking wheel consequently shifts axially towards said shaft end and prevents said shaft from further rotation in said other direction of rotation relative to said housing.

* * * * *